(12) United States Patent
Pike et al.

(10) Patent No.: US 7,843,928 B2
(45) Date of Patent: Nov. 30, 2010

(54) EGRESS TRAFFIC MANAGEMENT SYSTEM FOR A DATA COMMUNICATIONS SYSTEM

(75) Inventors: Dion Pike, Stittsville (CA); Mark Megarity, Ottawa (CA); Joey Chow, Nepean (CA)

(73) Assignee: Alcatel Lucent, Paris (FR)

( * ) Notice: Subject to any disclaimer, the term of this patent is extended or adjusted under 35 U.S.C. 154(b) by 378 days.

(21) Appl. No.: 11/902,709

(22) Filed: Sep. 25, 2007

(65) Prior Publication Data

US 2009/0080329 A1    Mar. 26, 2009

(51) Int. Cl.
*H04L 12/56* (2006.01)

(52) U.S. Cl. .................. 370/392; 370/395.72; 370/417; 370/429

(58) Field of Classification Search ........................ None
See application file for complete search history.

(56) References Cited

U.S. PATENT DOCUMENTS

2005/0169447 A1   8/2005  Wong
2007/0058541 A1   3/2007  Pike et al.

*Primary Examiner*—Gregory B Sefcheck
(74) *Attorney, Agent, or Firm*—Kramer & Amado, P.C.

(57) ABSTRACT

An egress traffic management system for a data communication system is disclosed. The egress traffic management system makes use of a hierarchical queue ID header paradigm that enables data packets to be directed for egress traffic management to either one of a plurality of assignable queues in a main egress queue module or to one of a plurality of distributed queue modules via a common queue of the main egress queue module. This behavior enables egress traffic management functionality and scale to be varied independently and in a cost-effective manner to meet evolving requirements of a data communications system.

16 Claims, 1 Drawing Sheet

EGRESS TRAFFIC MANAGEMENT SYSTEM FOR A DATA COMMUNICATIONS SYSTEM

FIELD OF THE INVENTION

The invention is directed to communication networks, particularly to providing flexibility in both scale and functionality of egress traffic management in a data communications system.

BACKGROUND OF THE INVENTION

One of the challenges in designing state of the art traffic management systems is that often the cost of the traffic management circuitry becomes a "barrier to entry". This is especially the case for egress traffic management, which term refers to management of data packet traffic flows exiting a data communication system such as a data packet switch or router. Specifically, many traffic management schemes have a centralized egress queuing point from which traffic is scheduled. This results in traded-offs relating to cost and flexibility of future applications.

One problem is that the scale of the traffic management requirements needs to be determined ahead of time and designed into the data communication system. These requirements are often related to supporting many applications, some of which are unique to various customers. Some of the main factors in this regard are the depth of memory, the number of queuing entities, and the number of virtual output ports used for egress traffic management. Often, the cost of satisfying these requirements makes it difficult to meet low "Cost of Entry" market demands. Furthermore, if the scale of traffic management requirements has been met in the most cost-effective manner, then often there is not enough flexibility in the egress traffic management functionality to support new applications.

Accordingly, there is a need for an egress traffic management system that provides flexibility in both scale and functionality of egress traffic management in a cost-effective manner.

SUMMARY OF THE INVENTION

It is an object of the invention to provide an egress traffic management system for a data communication system.

According to an aspect of the invention an egress traffic management system for a data communication system is provided. The egress traffic management system includes a packet processor that is operable to receive a data packet from a switch fabric and to affix an egress queue header to the data packet; a main egress queue module having a set of internal queues for data packets and that is operable to receive the data packet from the packet processor and to forward the data packet to one of the internal queues depending upon a main queue identifier of the egress queue header; and an interface module that is operable to receive the data packet from the main egress queue module and to forward the data packet to either a main input/output module or one of a plurality of distributed queue modules in accordance with a secondary queue identifier of the egress queue header.

Preferably, the set of internal queues includes a common queue and a plurality of assignable queues. Accordingly, the main queue identifier provides either an identifier of one of the assignable queues to which the data packet is to be forwarded or provides an indication that the data packet is to be forwarded to the common queue.

Advantageously, one or more of the assignable queues may be specific to a customer, a network, a virtual local area network, or an application.

According to another aspect of the invention a method of egress traffic management of data packets in a communications system is provided. The method comprising the steps of: receiving a data packet from a switch fabric; affixing an egress queue header to the data packet; determining whether to forward the data packet to one of a plurality of internal queues of a main egress queue or to forward the data packet to one of a plurality of distributed queue modules depending upon a main queue identifier of the egress queue header; and forwarding the data packet according to the determination.

Embodiments of the invention provide a "pay as you grow" aspect to egress traffic management that enables egress traffic management functionality and scale to be varied independently and in a cost-effective manner to meet evolving requirements of a data communications system.

BRIEF DESCRIPTION OF THE DRAWINGS

The invention will be further understood from the following detailed description with reference to the drawings, in which.

DETAILED DESCRIPTION

Figure 1:
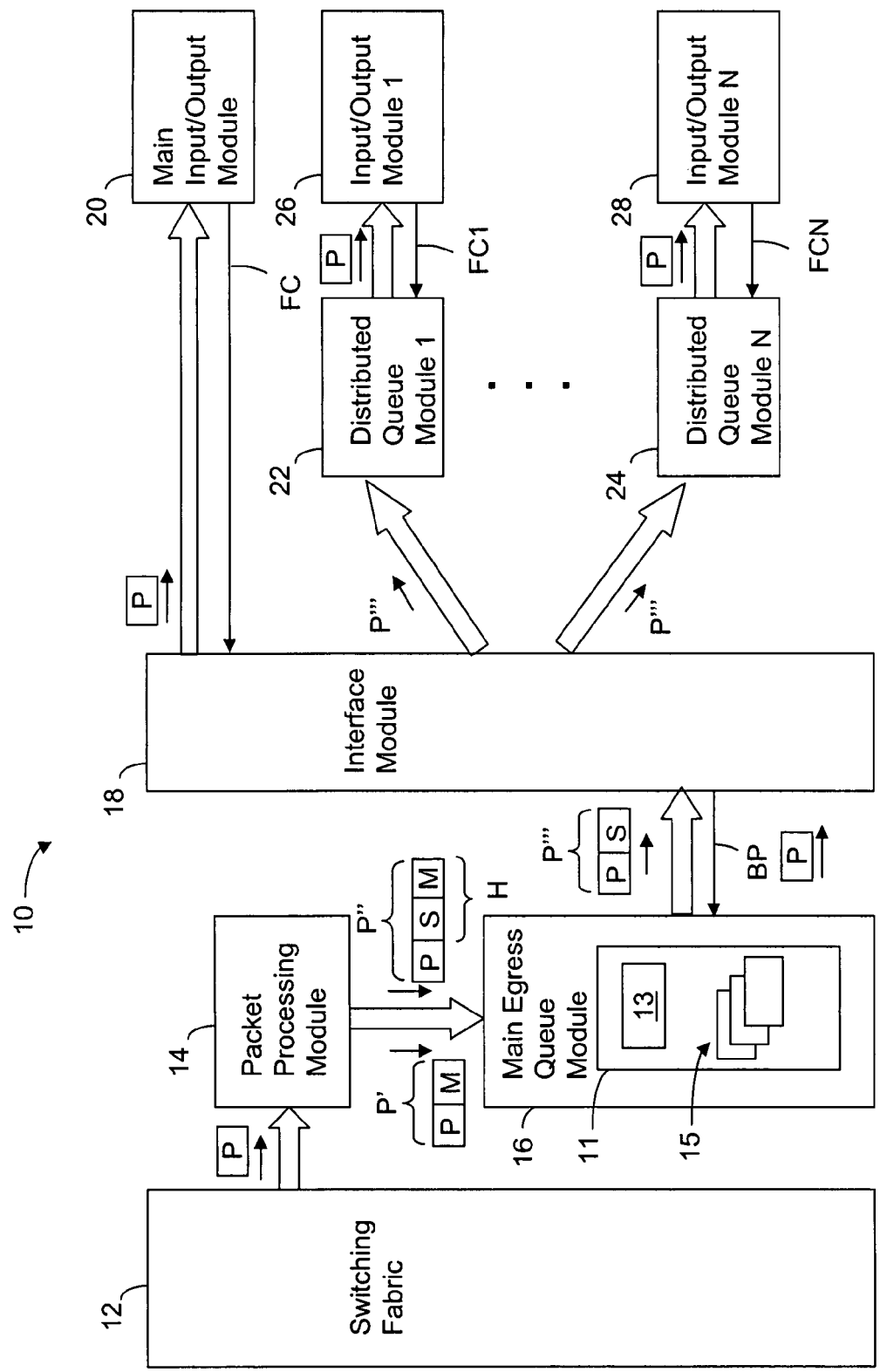
FIG. 1 is a high-level functional block diagram of an egress traffic management system according to an embodiment of the invention.

Referring to FIG. 1, a high level block diagram of an egress traffic management system 10 in accordance with the present invention is depicted. The FIGURE also shows a switching fabric 12, which supplies data packets to the egress traffic management system 10 but does not form part thereof.

The egress traffic management system 10 includes a packet processing module 14 coupled to a main egress queue module 16. The packet processing module 14 receives data packets P from the switch fabric 12, affixes an egress queue header H to each data packet, and then sends the modified data packets P', P" to the main egress queue module 16. The main egress queue module 16 includes a set of internal queues 11 for data packets P', P". The set of internal queues 11 includes a common queue 13 and a plurality of customer-specific queues 15. The customer-specific queues 13 could be considered generally as assignable queues since one or more of them could be assigned to a particular customer, network, virtual local area network, or an application.

The egress queue header H includes a main queue ID M and a secondary queue ID S. The secondary queue ID S could also be viewed as an embedded queue ID with regard to the main egress queue module 16 since the secondary queue ID S is transparent to the main egress queue module 16 in that it does not affect the operation thereof. The main queue ID M is used to direct a data packet P' to a main input/output module 20 via one of the customer-specific queues 15 or to direct a data packet P'" to the internal common queue 13. The secondary queue ID S is used to direct a data packet P" to a distributed queue module 22, 24. The main egress queue module 16 removes the main queue ID M before forwarding the data packet P, P'".

The various forms of data packets shown in FIG. 1 and referred to hereinafter will now be described for greater clarity. The first form P is a data packet without any egress queue header H. The second form P' includes an egress header H that has a main queue ID M but no secondary queue ID S. The third form P" is a data packet having an egress queue header H that includes a main queue ID M and a secondary queue ID S. The fourth form P''' is a data packet having an egress queue header H that includes a secondary queue ID S but no main queue ID M.

The main egress queue module 16 is coupled to an interface module 18. This coupling provides a path for data packets P', P''' and for backpressure information BP. The main egress queue module 16 receives data packets P', P''' from the packet processing module 14. Based on the main queue ID M of each data packet P', P''', the main egress queue module 16 either forwards the data packet P' to one of the customer-specific queues 15 associated with a specific customer traffic flow or directs the data packet P'' to the common queue 13. In the case of the latter the data packet P''' would subsequently be directed to one of the distributed queue modules 22, 24 based on the secondary queue ID S. In either case, after the main egress queue module removes the main queue ID header M resulting in data packets P, P''', those data packets would be sent to the interface module 18 before being transmitted to a distributed queue module 22, 24 or a main input/output module 20.

The packet processing module 14 determines the content of each egress queue header H, and thereby whether the corresponding data packet P is to be forwarded to one of the internal customer-specific queues 15 or to a distributed queue module 22, 24 based on the egress traffic management functionality that is to be applied to a particular packet, according to information contained in the packet and/or information about a traffic flow to which the data packet belongs.

The interface module 18 receives data packets P from the customer-specific queues 15 and sends such data packets to the main input/output module 20 coupled thereto. The interface module 18 also receives data packets P''' from the common queue 13 and forwards each one of such data packets to one of the distributed queue modules 22, 24 in accordance with the secondary queue ID S of each of the data packets.

The interface module 18 is connected to a plurality of distributed queue modules 22, 24. This connection provides a path for data packets P''' to respective distributed queue modules 22, 24. The distributed queue modules 22, 24 each receives data packets P''' from the interface module 18 and remove the secondary queue ID S before transmitting the data packets P'. The distributed queue modules 22, 24 are each connected to a respective input/output module 26, 28. This connection provides a path for data packets P and for flow control information FC1 to FCN to provide flow control capability with respect to the flow of data packets P from distributed queue modules 22, 24. The main input/output module 20 is also connected to the interface module 18. This connection provides a path for data packets P and flow control information FC to provide flow control capability with respect to the flow of data packets P from the customer-specific queues 15. In this case, the interface module 18 may provide some translation of the flow control information FC before communicating the backpressure information BP to the customer-specific queues 15. For example, such translation would be required in a case where the main input/output module 20 provides one method of flow control information FC but the main egress queue module 16 requires a different method of backpressure information BP. Both of the flow control information FC and backpressure information BP may include information such as information on traffic flows of multiple priorities, fill levels of virtual output queues, etc.

The operation of the flow control functionality will now be explained in greater detail for the case in which data packets of a traffic flow are queued in the common queue 13 and for the case in which data packets of a traffic flow are queued in one of the customer-specific queues 15. In the latter case, the data packets would be transmitted from the data communications system via the main input/output module 20, which could have multiple ports of which one is experiencing backpressure. This port could be specific to a customer that has a traffic profile which the flow of data packets from the port must be within and which is being exceeded, hence the backpressure situation. Under this and similar scenarios, the main input/output module 20 would generate flow control information FC that would be communicated back to the particular one of the customer-specific queues 15, which is associated with the port experiencing backpressure. This flow control information FC would be communicated via the interface module 18 and the backpressure information BP to the main egress module 16. The flow control information FC and backpressure information BP would contain an indication of the port that is experiencing backpressure and hence make it possible to determine which one of the customer-specific queues should apply flow control to the traffic flow. In the case where data packets of a traffic flow are queued in the common queue 13, a distributed queue module 22, 24 that is transmitting those data packets from a port that is experiencing backpressure would generate corresponding flow control information FC1, FCN. This flow control information FC1, FCN would contain an indication of the specific port that is experiencing backpressure if the distributed input/output module 26, 28 had more than one port. The flow control information FC1, FCN would be communicated back to corresponding distributed queue module 22, 24, which would apply flow control to that traffic flow.

The egress traffic management system 10 in its most basic form would include only the packet processing module 14, the main egress queue module 16, and the interface module 18. The main input/output module 20 is not considered to be part of the egress traffic management system 10.

The egress traffic management system 10 in a more scaled-up form would include one or more of the distributed queue modules 22, 24. This form can be attained by adding one or more distributed queue modules 22, 24 to a more basic form. This expansion could be done for example if egress traffic management capacity and/or functionality requirements have increased from those that were satisfied by a more basic form. This capability is referred to as the "pay as you grow" aspect of embodiments of the invention The operation of the egress traffic management system 10 will now be further explained in the case where one or more distributed queue modules 22, 24 are included. The main queue ID M affixed to a data packet P by the packet processing module 14 provides either an identifier of one of the customer-specific queues 15 or the common queue 13. In the case of the latter, the main egress queue module 16 removes the main queue ID M from the data packet P'' before transmitting the data packet P''' to the interface module 18. Receiving such a data packet P''', the interface module 18 examines the secondary queue ID S. The secondary queue ID S provides an indication of one of the distributed queue modules 22, 24 to which the data packet P''' is to be sent. Upon receiving a data packet P''' from the interface module 18, the receiving distributed queue module 22, 24 queues the data packet P''' according to the secondary queue ID S and later removes the secondary queue ID S before forwarding the data packet P to a corresponding input/output module 26, 28 to which it is connected. The corresponding input/output module 26, 28 subsequently transmits the data packet P from the data communication system via one of its ports.

It should be understood that the foregoing description of operation is not intended to limit the interface module 18 to examining only the secondary queue ID S to determine to which distributed queue module 22, 24 the data packet P''' is to be sent. Other information associated with the data packet P''' such as port context, bus address field, or bits in a header of the data packet P could be used.

It should be noted that one or more distributed queue modules 22, 24 can be added to the egress traffic management system 10 up to a maximum number that are supported by the data communication system. A set of indications such as labels that provides an indication of distributed queue modules 22, 24 that are present in the egress traffic management system 10 is stored therein or otherwise made available to the packet processing module 14. The set of indications would include an indication of any queues contained in one or more of such modules, or would make derivation of such contained queues possible. The packet processing module 14 is therefore operable to select or otherwise determine one indication from the set of indications before affixing the egress queue header H to a data packet P so as to provide a secondary queue ID S. The actual selection mechanism used by the packet processing module 14 would depend on the egress traffic management functionality that is to be applied to a particular data packet P, according to information contained in the data packet P and/or information about a traffic flow to which the data packet P belongs.

An advantage of embodiments of the invention is that an "entry level" main egress queue module 16 can be designed with, for example, a fixed amount of queuing and fixed number of virtual output queues, without the main egress queue module 16 becoming a bottleneck to future growth of the data communication system. Distributed queue modules 22, 24 could then be added to increase the amount of buffering and number of virtual output queues outside of the main egress queue module 16 with growth of the data communications system. Further, the main egress queue module 16 can be used for common functions that are not intensive so that these functions do not need to be replicated in the distributed queue modules 22, 24.

The egress queue header H, via its main queue ID M and secondary queue ID S, supports a hierarchical queue ID header paradigm. This "queue ID within a queue ID" model allows existing distributed queue modules 22, 24, possibly implemented on separate circuit cards, to be used and yet at the same time enables benefits to be derived from feature enhancements in the main egress queue module 16. This model removes restrictions of a pre-determined queue ID structure and allows parts of the main and distributed queuing architecture (i.e. main egress queue module 16 and distributed queue modules 22, 24 respectively) to be changed as customer feature set demands change. For example, additional distributed queue modules 22, 24 could be added to the architecture, the main egress queue module 18 and any of the existing distributed queue modules 22, 24 could be replaced with versions having enhanced functionality, or any combination thereof. Furthermore, it should be appreciated that the number of levels of embedded queue IDs is not limited to 1. For example, an additional third queue ID in the egress queue header H after the secondary queue ID S could be used to indicate another queue module, subtended from one of the distributed queue modules 22, 24, to which a data packet is to be queued before being sent to an input/output module.

While the invention has been described with respect to specific embodiments, many modifications, variations, substitutions, and equivalents will be apparent to those skilled in the art. For example, the common queue 13 could comprise multiple queues, each for traffic flows of data packets of a certain priority. Similarly, the main input/output module 20 could comprise a plurality of input/output modules that collectively function as a main input/output module 20. Accordingly, the invention is to be considered as limited only by the spirit and scope of the appended claims.

What is claimed is:

1. An egress traffic management system for a data communication system, comprising:
    a packet processor operable to receive a data packet from a switch fabric and to affix an egress queue header to the data packet;
    a main egress queue module having a set of internal queues for data packets and being operable to receive the data packet from the packet processor and to forward the data packet to one of the internal queues identifier based on the contents of the egress queue header; and
    an interface module operable to:
        receive the data packet from the main egress queue module,
        forward the data packet to a main input/output module when the egress queue header does not contain at least a first secondary queue identifier, and
        forward the data packet to one of a plurality of distributed queue modules in accordance with the first secondary queue identifier when the egress queue header contains at least the first secondary queue identifier,
        wherein the one of the distributed queue modules further:
            forwards the data packet to a second main input/output module when the egress queue header contains a first secondary queue identifier and does not contain a second secondary queue identifier; and
            forwards the data packet to a one of a second plurality of distributed queue modules in accordance with the second secondary queue identifier when the egress queue header contains at least the first and second secondary queue identifiers, wherein the second plurality of distributed queue modules are subtended from the one of the plurality of distributed queue modules.

2. The egress traffic management system of claim 1, wherein the set of internal queues includes a common queue and a plurality of assignable queues, and wherein the main queue identifier indicates whether to direct the data packet to one of the plurality of assignable queues or to the common queue.

3. The egress traffic management system of claim 2, wherein the packet processor is further operable to determine the main queue identifier to be included in the egress queue header according to information contained in the data packet or information about a traffic flow to which the data packet belongs.

4. The egress traffic management system of claim 3, wherein the packet processor is further operable to determine the secondary queue identifier to be included in the egress queue header according to information contained in the data packet or information about a traffic flow to which the data packet belongs.

5. The egress traffic management system of claim 4, wherein the secondary queue identifier determines to which one of the distributed queue modules the data packet is to be forwarded.

6. The egress traffic management system of claim 5, further comprising a plurality of distributed queue modules operable to receive data packets forwarded by the interface module.

7. The egress traffic management system of claim 6, wherein the packet processor is further operable to determine the first secondary queue ID to be included in the egress queue header to select the indication of one of the distributed queue modules from a set of indications, the set being in accordance with distributed queue modules that are present in the egress traffic management system.

8. The egress traffic management system of claim 7, wherein the interface module is operable to translate flow control information into advanced backpressure information and communicate the latter to the main egress queue module.

9. The egress traffic management system of claim 8, wherein at least one distributed queue module of the plurality of distributed queue modules is operable to remove the first secondary queue identifier of a data packet before forwarding the data packet to a corresponding input/output module for transmission from the data communications system.

10. The egress traffic management system of claim 9, wherein at least one queue of the plurality of assignable queues is a customer-specific queue.

11. The egress traffic management system of claim 10, wherein the information about a traffic flow indicates that the traffic flow is specific to a customer.

12. The egress traffic management system of claim 11, wherein the main egress queue module removes the main queue identifier from the egress queue header before forwarding the data packet.

13. A method of egress traffic management of data packets in a communications system, the method comprising the steps of:
  receiving a data packet from a switch fabric;
  affixing an egress queue header to the data packet, the egress queue header comprising a main queue ID;
  forwarding the data packet to one of a plurality of internal queues of a main egress queue when the egress queue header does not contain at least a first secondary queue ID; and
  forwarding the data packet to one of a plurality of distributed queue modules when the egress queue header contains at least a first secondary queue ID,
  forwarding, by the one of the plurality of distributed queue modules, the data packet to a second main input/output module when the egress queue header contains a first secondary queue identifier and does not contain a second secondary queue identifier; and
  forwarding, by the one of the plurality of distributed queue modules, the data packet to a one of a second plurality of distributed queue modules in accordance with the second secondary queue identifier when the egress queue header contains at least the first and second secondary queue identifiers, wherein the second plurality of distributed queue modules are subtended from the one of the plurality of distributed queue modules.

14. The method of egress traffic management of claim 13, wherein the step of affixing comprises determining the main queue identifier to be included in the egress queue header according to information contained in the data packet or information about a traffic flow to which the data packet belongs.

15. The method of egress traffic management of claim 14, wherein the step of affixing further comprises determining at least the first secondary queue identifier to be included in the egress queue header according to information contained in the data packet or information about a traffic flow to which the data packet belongs.

16. The method of egress traffic management of claim 15, wherein the information about a traffic flow indicates that the traffic flow is specific to a customer.

* * * * *

UNITED STATES PATENT AND TRADEMARK OFFICE
CERTIFICATE OF CORRECTION

| | | |
|---|---|---|
| PATENT NO. | : 7,843,928 B2 | |
| APPLICATION NO. | : 11/902709 | |
| DATED | : November 30, 2010 | |
| INVENTOR(S) | : Dion Pike, Mark Megarity and Joey Chow | |

It is certified that error appears in the above-identified patent and that said Letters Patent is hereby corrected as shown below:

In column 6, line 13, delete the word "identifier."

Signed and Sealed this
Eighth Day of February, 2011

David J. Kappos
*Director of the United States Patent and Trademark Office*